(12) United States Patent
Jin et al.

(10) Patent No.: US 12,183,226 B2
(45) Date of Patent: Dec. 31, 2024

(54) TEST PAD AND CHIP ON FILM PACKAGE INCLUDING THE SAME

(71) Applicant: LX SEMICON CO., LTD., Daejeon (KR)

(72) Inventors: Seung Hoon Jin, Daejeon (KR); Young Min Choi, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 156 days.

(21) Appl. No.: 17/858,154

(22) Filed: Jul. 6, 2022

(65) Prior Publication Data
US 2023/0011967 A1 Jan. 12, 2023

(30) Foreign Application Priority Data

Jul. 12, 2021 (KR) ........................ 10-2021-0090688

(51) Int. Cl.
*G09G 3/00* (2006.01)
*G01R 3/00* (2006.01)
*G01R 31/27* (2006.01)

(52) U.S. Cl.
CPC ..... *G09G 3/006* (2013.01); *G09G 2300/0408* (2013.01); *G09G 2300/0426* (2013.01); *G09G 2330/12* (2013.01)

(58) Field of Classification Search
CPC ....... H01L 2924/14; H01L 2224/32225; H01L 25/0657; G01R 3/00; G01R 31/27
See application file for complete search history.

(56) References Cited

U.S. PATENT DOCUMENTS

| 5,260,168 | A | * | 11/1993 | Vernon | ............. | H01L 23/49572 |
| | | | | | | 430/311 |
| 7,834,453 | B2 | | 11/2010 | Chang | | |
| 2002/0121692 | A1 | * | 9/2002 | Lee | ......... | H01L 24/05 |
| | | | | | | 257/E21.705 |
| 2007/0231936 | A1 | * | 10/2007 | Kanda | ..................... | H01L 24/05 |
| | | | | | | 257/E23.021 |
| 2013/0240917 | A1 | * | 9/2013 | Cho | ......... | H01L 23/60 |
| | | | | | | 257/529 |
| 2021/0074622 | A1 | * | 3/2021 | Koo | ..................... | H05K 1/0268 |
| 2021/0333834 | A1 | * | 10/2021 | Hsu | ..................... | G02F 1/13452 |

FOREIGN PATENT DOCUMENTS

KR 10-1337167 B1 12/2013

\* cited by examiner

*Primary Examiner* — Jermele M Hollington
*Assistant Examiner* — Temilade S Rhodes-Vivour
(74) *Attorney, Agent, or Firm* — ROTHWELL, FIGG, ERNST & MANBECK, P.C.

(57) ABSTRACT

A chip on film (COF) package in which a predetermined driving integrated circuit (IC) is mounted includes a wiring structure connected to the driving IC, and a test pad connected to the wiring structure, wherein the test pad includes a base film divided into a first region and a second region, and a conductive layer located in the first region, and the second region is surrounded by the first region in a plan view.

17 Claims, 12 Drawing Sheets

TEST PAD AND CHIP ON FILM PACKAGE INCLUDING THE SAME

CROSS-REFERENCE TO RELATED APPLICATIONS

This application claims the benefit of the Korean Patent Applications No. 10-2021-0090688 filed on Jul. 12, 2021, which are hereby incorporated by reference as if fully set forth herein.

FIELD OF THE INVENTION

The present disclosure relates to a test pad and a chip on film package including the same.

BACKGROUND

Recently, with developments in the industry of flat panel displays such as liquid crystal displays (LCDs), the manufacturing industry of tape packages, which are driving integrated circuit (IC) components of flat panel displays, has also been developing. Such tape packages are semiconductor packages using a base film, and may be divided into tape carrier packages (TCPs) and chip on film (COF) packages.

In general, a tape package utilizes a tape automated bonding (TAB) method using an input/output wiring pattern formed on a base film as an external connection terminal and is mounted by directly attaching the input/output wiring pattern to a printed circuit board (PCB) or a display panel.

In the manufacturing process of a tape package, a test process for testing electrical characteristics of a driving IC mounted on a base film is performed. Specifically, probe needles of a probe card come into contact with conductive layers formed on the base film to test driving ICs. The conductive layers are electrically connected to the input/output wiring pattern through connection leads.

The conductive layers are spaced a predetermined distance from each other, and the probe needles come into contact with the corresponding conductive layers.

In recent years, as the number of wiring patterns input and output to/from the driving IC has increased, a size of the base film on which the driving IC is mounted and a line width of the wiring pattern have gradually decreased.

SUMMARY

An object of the present invention is to provide a test pad for efficiently performing a test for electrical characteristics of a driving integrated circuit (IC) and improving a yield of the test, and a chip on film package including the same.

A chip on film (COF) package according to an embodiment of the present invention in which a predetermined driving IC is mounted includes a wiring structure connected to the driving IC, and a test pad connected to the wiring structure, wherein the test pad includes a base film divided into a first region and a second region, and a conductive layer located in the first region, and the second region is surrounded by the first region in a plan view.

A test pad according to an embodiment of the present invention includes a region having a difference in thickness, and when a test process is performed on a COF package through a conductive layer, probe needles are fixed to a thin region by a thick region to prevent the probe needles from moving to another conductive layer.

The test pad according to the embodiment of the present invention can improve test efficiency by preventing a short between different conductive layers that can be caused by the probe needle.

BRIEF DESCRIPTION OF THE DRAWINGS

The accompanying drawings, which are included to provide further understanding of the disclosure and are incorporated in and constitute a part of this application, illustrate embodiments of the disclosure, and together with the description serve to explain the principle of the disclosure. In the drawings.

DETAILED DESCRIPTION

Figure 1:
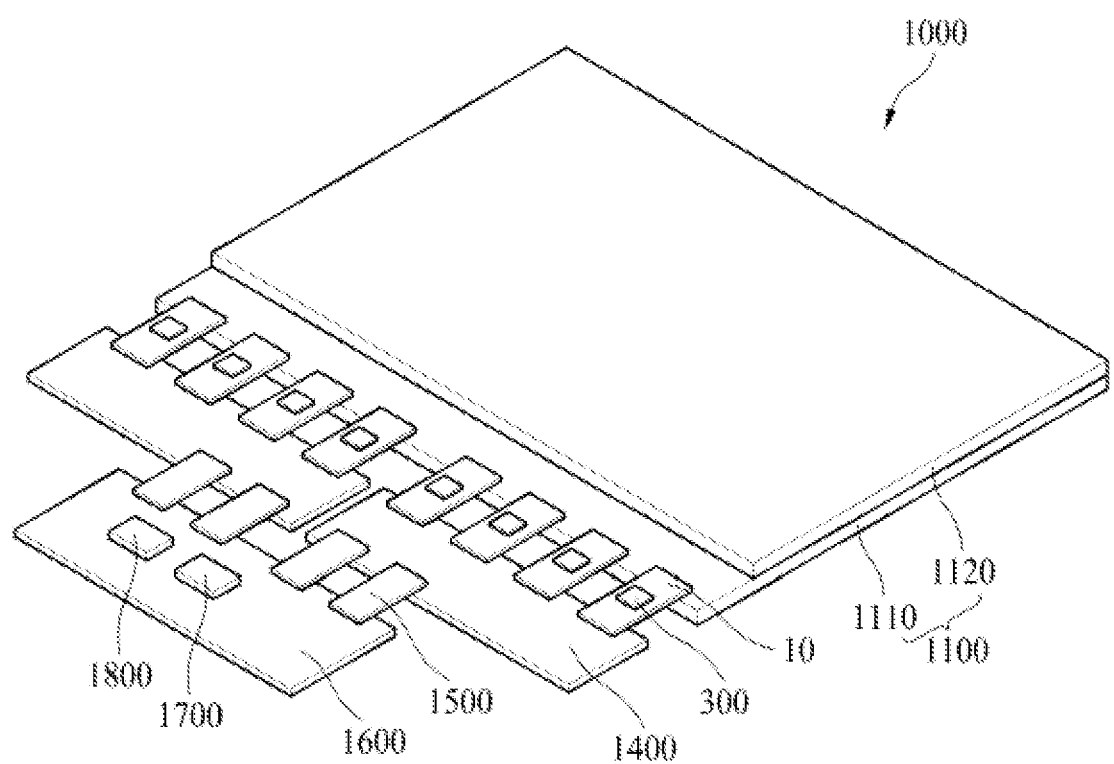
FIG. 1 is a perspective view showing a display device according to an embodiment.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only-' is used. The terms of a singular form may include plural forms unless referred to the contrary.

In construing an element, the element is construed as including an error range although there is no explicit description.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a display device according to an embodiment of the present invention will be described in detail with reference to FIG. 1. FIG. 1 is a perspective view showing the display device according to the embodiment.

Referring to FIG. 1, the display device according to the embodiment of the present invention includes a display panel 1100, driving integrated circuits (ICs) 300, chip on film (COF) packages 10, a source circuit board 1400, flexible cables 1500, a control circuit board 1600, a timing control part 1700, and a voltage supply part 1800.

The display panel 1100 may include a lower substrate 1110 and an upper substrate 1120. The lower substrate 1110 may be formed of a glass substrate or a plastic film, and the upper substrate 1120 may be formed of an organic substrate, a plastic film, an encapsulation film, or a barrier film.

The display panel 1100 includes a display region and a non-display region provided around the display region. The display region is a region in which pixels are formed to display an image. The display panel 1100 includes data lines and scan lines that cross each other, and each of the pixels may be connected to any one of the data lines and any one of the scan lines. The display panel 1100 may be configured of a liquid crystal display panel or an organic light emitting display panel.

The driving ICs 300 may be mounted on each of the COF packages 10. Each of the COF packages 10 will be described below in detail with reference to FIGS. 2 to 6. Each of the COF packages 10 may be attached on the lower substrate 1110 by a tape automated bonding (TAB) method using an anisotropic conductive film, and thus each of the driving ICs 300 may be connected to the data lines of the display panel 1100.

Each of the driving ICs 300 supplies a data voltage to the data line. Each of the driving ICs 300 receives an input of digital video data and a data timing control signal from the timing control part 1700. Each of the driving ICs 300 converts digital video data into data voltages according to a data timing control signal and applies the data voltages to the data lines.

The display panel 1100 may include a scan driving part that is connected to the scan lines to apply scan signals. The scan driving part generates the scan signals according to a scan timing control signal input from the timing control part 1700 and applies the scan signals to the scan lines. In this case, the scan driving part may be formed in the non-display region of the display panel 1100 by a gate driver in panel (GIP) method including a plurality of transistors. Alternatively, the scan driving part 1300 may be formed in the form of a driving IC and may be mounted on a gate flexible film attached to the lower substrate 1110 of the display panel 1100.

The source circuit board 1400 may include first connectors (not shown) that are connected to the flexible cables 1500. The source circuit board 1400 may be connected to the flexible cables 1500 through the first connectors. The source circuit board 1400 may be a flexible printed circuit board or a printed circuit board.

The control circuit board 1600 may be a flexible printed circuit board or a printed circuit board. The control circuit board 1600 may include second connectors (not shown) that are connected to the flexible cables 1500. The control circuit board 1600 may be connected to the flexible cables 1500 through the second connectors. However, embodiments according to the present invention are not limited thereto.

The timing control part 1700 receives digital video data and timing signals from an external system-on-chip. The timing signals may include a vertical sync signal, a horizontal sync signal, a data enable signal, and a clock.

The timing control part 1700 generates control signals for controlling operation timings of the driving ICs 300 and the scan driving part. The control signals include a data timing control signal for controlling the operation timing of the driving IC 300 and a scan timing control signal for controlling the operation timing of the scan driving part. The timing control part 1700 supplies a data timing control signal and digital video data to the driving ICs 300 and supplies the scan timing control signal to the scan driving part.

The voltage supply part 1800 generates various driving voltages from main power applied from the outside and supplies the driving voltages to the display panel 1100, the scan driving part, and the driving ICs 300.

The timing control part 1700 and the voltage supply part 1800 may be mounted on the control circuit board 1600. In this case, the timing control part 1700 and the voltage supply part 1800 may be formed in the form of a driving IC.

Figure 2:
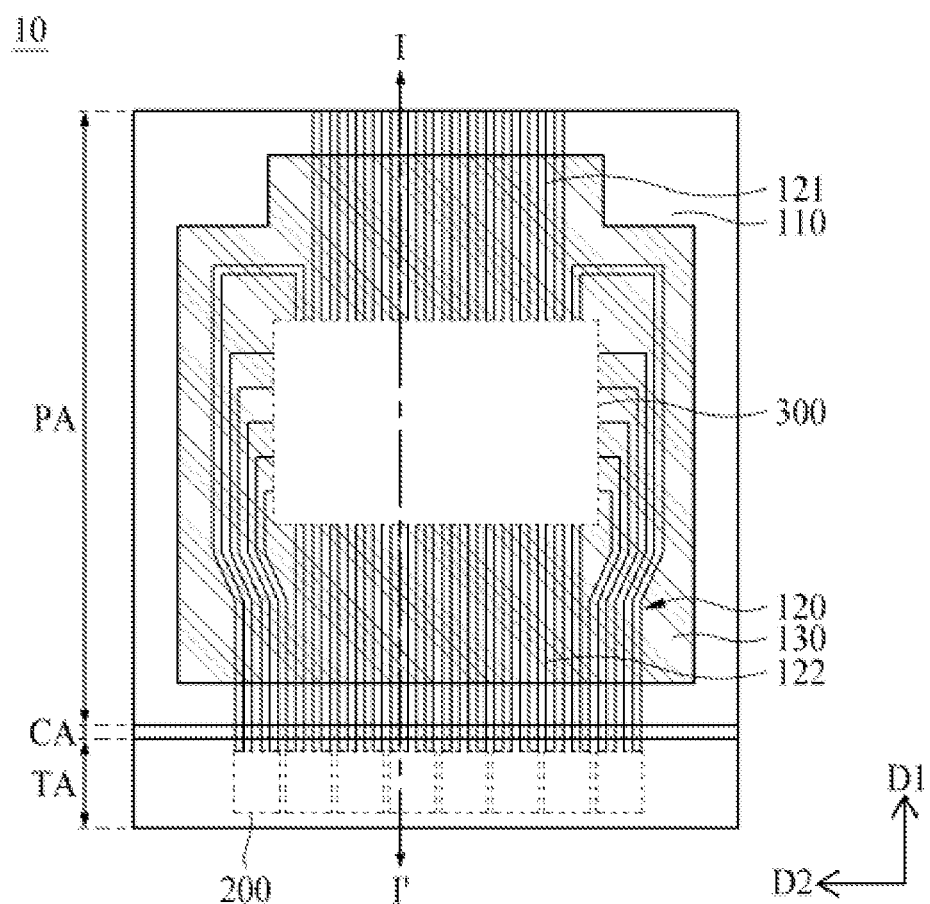
FIG. 2 is a plan view of a chip on film (COF) package according to the embodiment of the present invention.
Figure 3:
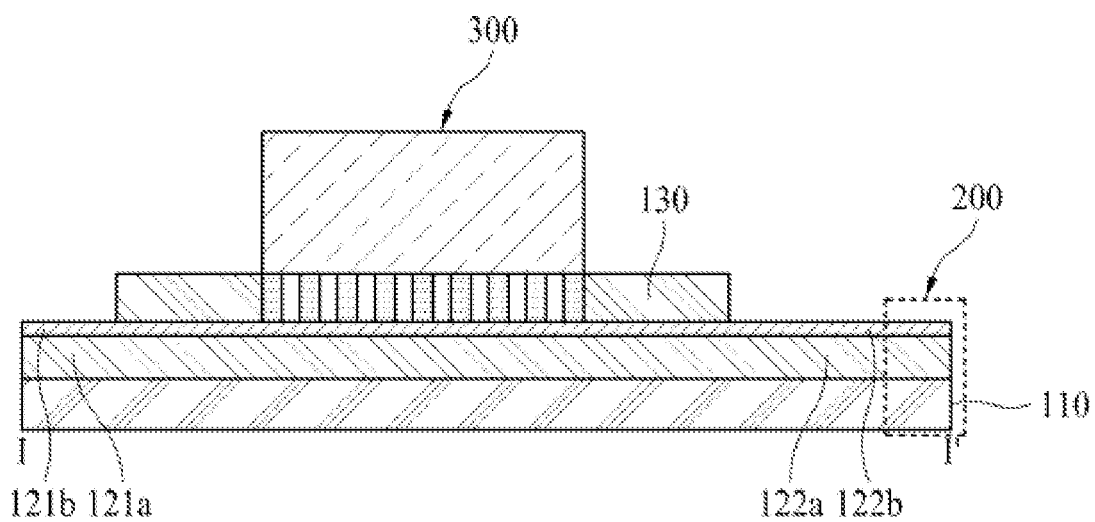
FIG. 3 is a cross-sectional view along line I-I' of FIG. 2.

Hereinafter, a COF package according to an embodiment of the present invention will be described in detail with reference to FIGS. 2 and 3. FIG. 2 is a plan view of the COF package according to the embodiment of the present invention, and FIG. 3 is a cross-sectional view along line I-I' of FIG. 2.

Referring to FIG. 2, the COF package 10 according to the embodiment of the present invention includes a base film 110, a wiring structure 120, an insulating member 130, and a conductive layer 210.

The base film 110 has a package region PA in which the driving IC 300 is mounted and a test pad region TA located on at least one side of the package region PA and has a cut region CA for separating the test pad region TA from the package region PA.

The base film 110 may be formed of a plastic film. For example, the base film 110 may be a sheet or film including a cellulose resin such as triacetyl cellulose (TAC) or diacetyl cellulose (DAC), a cyclo olefin polymer (COP) or a cyclo olefin copolymer (COC) such as norbornene derivatives, an acrylic resin such as poly(methylmethacrylate) (PMMA), a polyolefin such as polycarbonate (PC), polyethylene (PE) or polypropylene (PP), polyvinyl alcohol (PVA), poly ether sulfone (PES), polyetheretherketone (PEEK), polyetherimide (PEI), polyethylenenaphthalate (PEN), polyethyleneterephthalate (PET), polyimide (PI), polysulfone (PSF), a fluoride resin, or the like, but the present invention is not limited thereto.

As shown in FIG. 2, the wiring structure 120 may be formed in the first direction D1 on the base film 110. The wiring structure 120 may include a plurality of input wires 121 and a plurality of output wires 122.

As shown in FIG. 3, the wiring structure 120 includes first wiring pattern layers 121a and 122a and second wiring pattern layers 121b and 122b. At this time, the first wiring pattern layers 121a and 122a may be formed by attaching a metal thin film on the surface of the base film 110 by an electrodeposition or thermocompression process and then using photolithography and etching processes. For example, the first wiring pattern layers 121a and 122a may be formed of copper (Cu), gold (Au), tin (Sn), lead (Pb), silver (Ag), nickel (Ni), or the like. Then, the second wiring pattern layers 121b and 122b may be formed on the first wiring pattern layers 121a and 122a to have a predetermined thickness by electroplating another metal. However, the method of forming the first wiring pattern layers 121a and 122a and the second wiring pattern layers 121b and 122b is not limited thereto.

The driving IC 300 includes bumps connected to the input wires 121 and the output wires 122. The driving IC 300 generates data voltages according to input signals received through the input wires 121 and outputs the data voltages through the output wires 122. The insulating member 130 may cover at least a part of the wiring structure 120. Referring to FIGS. 2 and 3, the insulating member 130 covers at least a part of the input wires 121 and the output wires 122 located outside a region in which the driving IC 300 is mounted. The insulating member 130 may include solder resist.

A test pad 200 is a structure for testing electrical characteristics of the driving IC 300 and may be located in the test pad region TA. At this time, a plurality of test pads 200 may be disposed in a first direction D1 and a second direction D2 orthogonal to the first direction D1. However, a position of the test pad 200 is not limited thereto.

The test pad 200 according to the embodiment of the present invention includes the base film 110 divided into a first region A1 and a second region A2, and the conductive layer 210 located in the first region A1 and can prevent a short between different test pads that may be caused by the probe needle, thereby improving electrical test efficiency of the driving IC 300. This will be described below in detail with reference to FIGS. 4 and 6.

Figure 4:
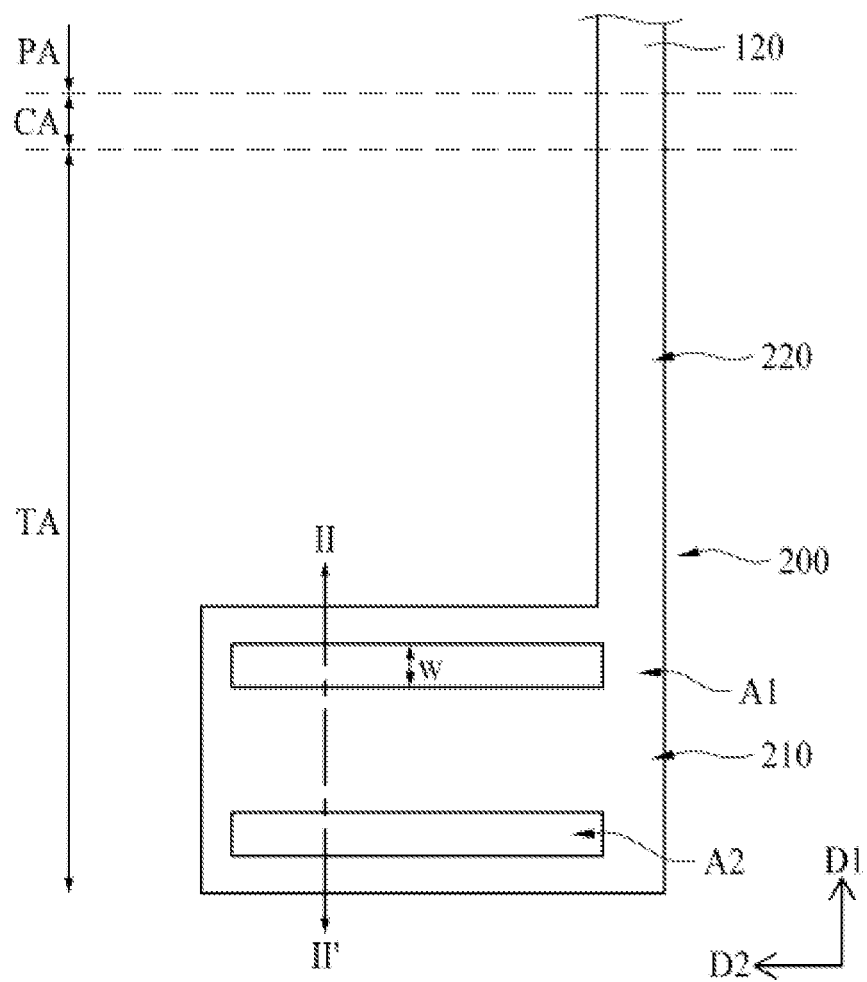
FIG. 4 is a plan view of a test pad according to an embodiment of the present invention.
Figure 5:
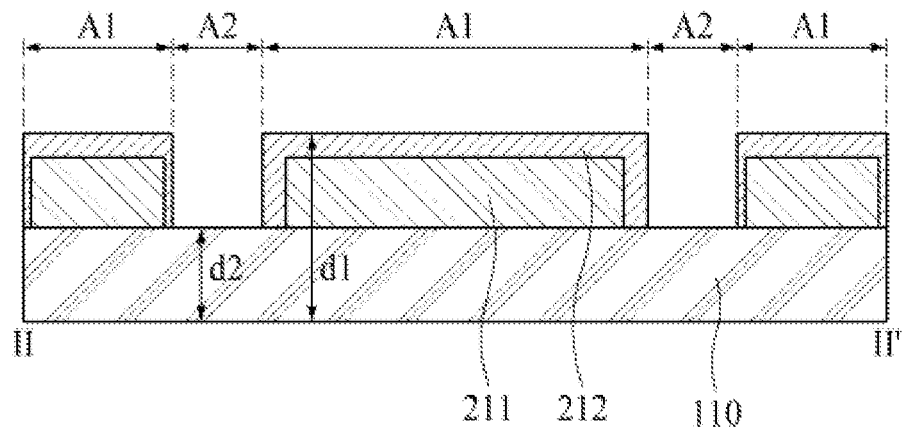
FIG. 5 is a cross-sectional view along line II-II' of FIG. 4.
Figure 6:
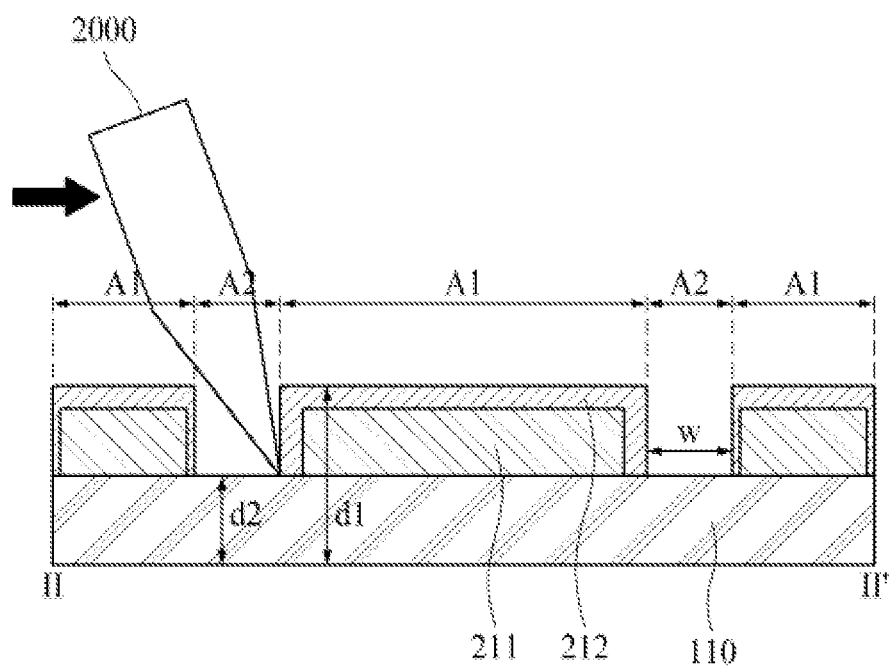
FIG. 6 is a view showing a test process of the COF package according to the embodiment of the present invention.

The test pad according to the embodiment of the present invention will be described in detail with reference to FIGS. 4 to 6. FIG. 4 is a plan view of the test pad according to an embodiment of the present invention. FIG. 5 is a cross-sectional view along line II-II' of FIG. 4, and FIG. 6 is a view showing a test process of a COF package according to the embodiment of the present invention.

In a manufacturing process of the COF package, a test process for testing the electrical characteristics of the driving IC 300 mounted on the base film 110 is performed, and the probe needles come into contact with the conductive layers 210 to test the electrical characteristics of the mounted driving IC.

Referring to FIGS. 4 and 5, the test pad 200 includes the base film 110 divided into the first region A1 and the second region A2, the conductive layer 210 located in the first region A1 of the base film 110, and a connection lead 220 that connects the conductive layer 210 to the wiring structure 120.

The base film 110 may be divided into the first region A1 and a plurality of second regions A2. According to the embodiment of the present invention, the first region A1 may have a shape surrounding the second region A2. The second region A2 may have a rectangular shape that extends in the second direction D2. As shown in FIG. 4, the second region A2 may be formed in a polygonal shape such as a quadrangle. However, a shape of the second region A2 is not limited thereto. In addition, the second region A2 may have a width greater than a width of the probing needle so that the probing needle is fixed in the second region A2 and come into contact with a first conductive layer 211 or a second conductive layer 212 located in the first region A1. For example, the base film 110 may include two second regions A2 having a rectangular shape that extends in the second direction D2. For example, the second region A2 may have a width w of 20 μm or more. However, a shape of the second region A2 is not limited thereto, and the second region A2 will be described in detail with reference to FIGS. 11A to 11C.

As shown in FIG. 5, the conductive layer 210 includes the first conductive layer 211 and the second conductive layer 212. Like the first wiring pattern layers 121a and 122a, the first conductive layer 211 may be formed by attaching a metal thin film on the surface of the base film 110 by an electrodeposition or thermocompression process and then using photolithography and etching processes. For example, the first conductive layer 211 may be formed of copper (Cu), gold (Au), tin (Sn), lead (Pb), silver (Ag), nickel (Ni), or the like. In this case, the first conductive layer 211 may be integrally formed with the first wiring pattern layers 121a and 122a. Then, the second conductive layer 212 may be formed on the first conductive layer 211 to have a predetermined thickness by electroplating another metal. For example, the second conductive layer 212 may be formed of copper (Cu), gold (Au), tin (Sn), lead (Pb), silver (Ag), nickel (Ni), or the like. At this time, the second conductive layer 212 may be integrally formed with the second wiring pattern layers 121b and 122b. However, the methods and materials for forming the first conductive layer 211 and the second conductive layer 212 are not limited thereto.

According to the embodiment of the present invention, the test pad 200 has a first thickness d1 in the first region A1 and a second thickness d2 smaller than the first thickness d1 in the second region A2 (d1>d2). Specifically, the first conductive layer 211 and the second conductive layer 212 are located in contact with each other in the first region A1 and are not located in the second region A2 so that the base film 110 is exposed. That is, the first conductive layer 211 and the second conductive layer 212 are located in the first region A1 and are not located in the second region A2, and the test pad 200 has a greater thickness in the first region A1 than in the second region A2 (d1>d2). Thus, the second region A2 of the base film 110 may be exposed through a shape of a groove of which a side surface is defined by at least one of the first conductive layer 211 and the second conductive layer 212 located in the first region A1 and a bottom surface is defined by the base film 110.

According to the present invention, as shown in FIG. 6, since the test pad 200 has a greater thickness in the first region A1 than in the second region A2 (d1>d2), even though pressure is applied to the probe needle 2000 when the electrical characteristics of the driving IC 300 are tested using the probe needle 2000, the probe needle 2000 is fixed in the second region A2 and does not shift, and a short that may occur between the different test pads 200 is prevented. Thus, it is possible to improve a yield of the test for the electrical characteristics of the integrated driving circuit 300.

After the test on the electrical characteristics of the driving IC 300, the test pad region TA is separated by cutting in the cut region CA of the base film 110, and the wiring structure 120 of the COF package 10 from which the test pad region TA is separated is electrically connected to the display panel 1100 and a printed circuit board such as the source circuit board 1400 or the control circuit board 1600 to manufacture a display device 1000 such as a liquid crystal display device.

Referring back to FIG. 4, the conductive layer 210 is electrically connected to the wiring structure 120 through the connection lead 220. Specifically, the conductive layer 210 is connected to the wiring structure 120 through the connection lead 220 and is connected to the driving IC 300 through the wiring structure 120 connected to the connection lead 220.

The connection lead 220 includes a first connection lead layer located on the base film 110 and a second connection lead layer located on the first connection lead layer. Like the first wiring pattern layers 121a and 122a and first conductive layer 211, the first connection lead layer may be formed by attaching a metal thin film on the surface of the base film 110 by an electrodeposition or thermocompression process and then using photolithography and etching processes. For example, the first connection lead layer may be formed of copper (Cu), gold (Au), tin (Sn), lead (Pb), silver (Ag), nickel (Ni), or the like. At this time, the first connection lead layer may be integrally formed with the first wiring pattern layers 121a and 122a and the first conductive layer 211. Then, the second connection lead layer may be formed on the first connection lead layer to have a predetermined thickness by electroplating another metal. For example, the second connection lead layer may be formed of copper (Cu), gold (Au), tin (Sn), lead (Pb), silver (Ag), nickel (Ni), or the like. At this time, the second connection lead layer may be integrally formed with the second wiring pattern layers 121b and 122b and the second conductive layer 212. However, the methods and materials for forming the first connection lead layer and the second connection lead layer are not limited thereto.

Figure 7:
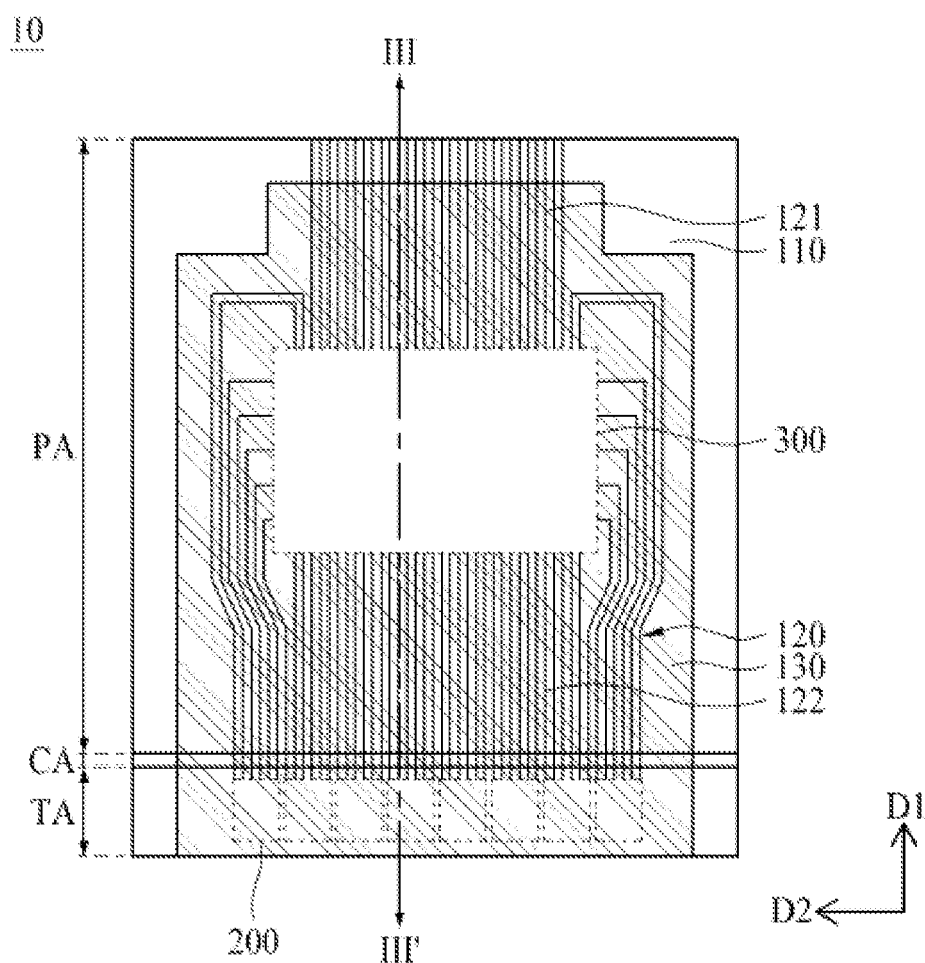
FIG. 7 is a plan view of a COF package according to another embodiment of the present invention.
Figure 8:
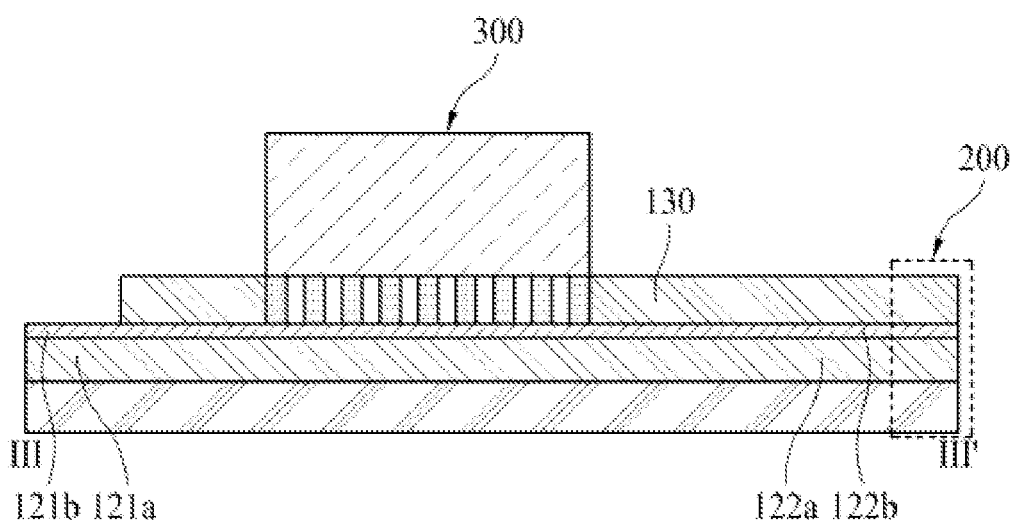
FIG. 8 is a cross-sectional view along line III-III' of FIG. 7.
Figure 9:
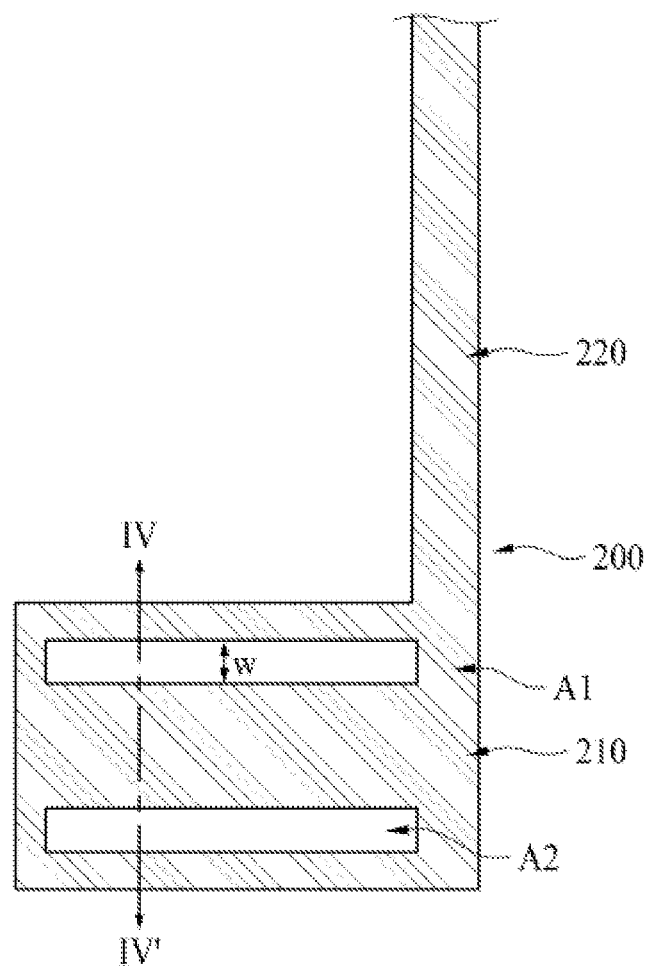
FIG. 9 is a plan view of a test pad according to another embodiment of the present invention.

A test pad and a COF package including the same according to another embodiment of the present invention will be described in detail with reference to FIGS. 7 to 10. FIG. 7 is a plan view of the COF package according to another embodiment of the present invention, and FIG. 8 is a cross-sectional view along line III-Ill' of FIG. 7. FIG. 9 is a plan view of the test pad according to another embodiment of the present invention, and FIG. 10 is a cross-sectional view along line IV-IV' of FIG. 9.

Referring to FIG. 7, the insulating member 130 may cover at least a part of the package region PA, the cut region CA, and the test pad region TA. Thus, as shown in FIGS. 7 and 8, the insulating member 130 covers at least a part of the input wires 121 and the output wires 122 located outside the region in which the driving IC 300 is mounted. In particular, according to another embodiment of the present invention, the test pad 200 may include the insulating member 130.

According to another embodiment of the present invention, the test pad 200 includes the base film 110 divided into the first region A1 and the second region A2, the conductive layer 210 located in the first region A1 and the second region A2, and the insulating member 130 located in the first region A1.

Figure 10:
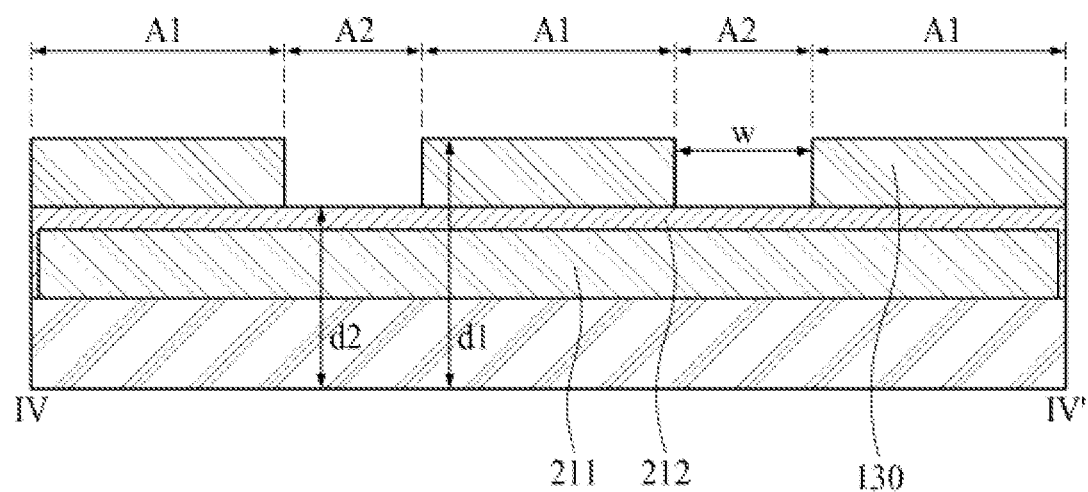
FIG. 10 is a cross-sectional view along line IV-IV' of FIG. 9.

According to another embodiment of the present invention, as shown in FIGS. 9 and 10, the insulating member 130 may be located in the first region A1 to surround the second region A2 in a plan view. FIG. 9 shows that the insulating member 130 covers only the conductive layer 210 and the connection lead 220, but the insulating member 130 is not limited thereto, and may cover a region other than the first region A1 and the second region A2 in the test pad region TA of the base film 110.

As shown in FIG. 10, the conductive layer 210 including the first conductive layer 211 and the second conductive layer 212 is located in the first region A1 and the second region A2, and the insulating member 130 is located in the first region A1 and is not located in the second region A2. In particular, according to another embodiment of the present invention, the insulating member 130 may be located on the first conductive layer 211 and the second conductive layer 212 located in the first region A1. For example, the insulating member 130 may have a thickness of 6 μm or more in the first region A1. Thus, the test pad 200 has a greater thickness in the first region A1 than in the second region A2 (d1>d2), the first conductive layer 211 or the second conductive layer 212 located in the second region A2 may be exposed through a groove of which a side surface is defined by the insulating member 130 located in the first region A1 and a bottom surface is defined by at least one of the first conductive layer and the second conductive layer located in the second region A2.

Figure 11A:
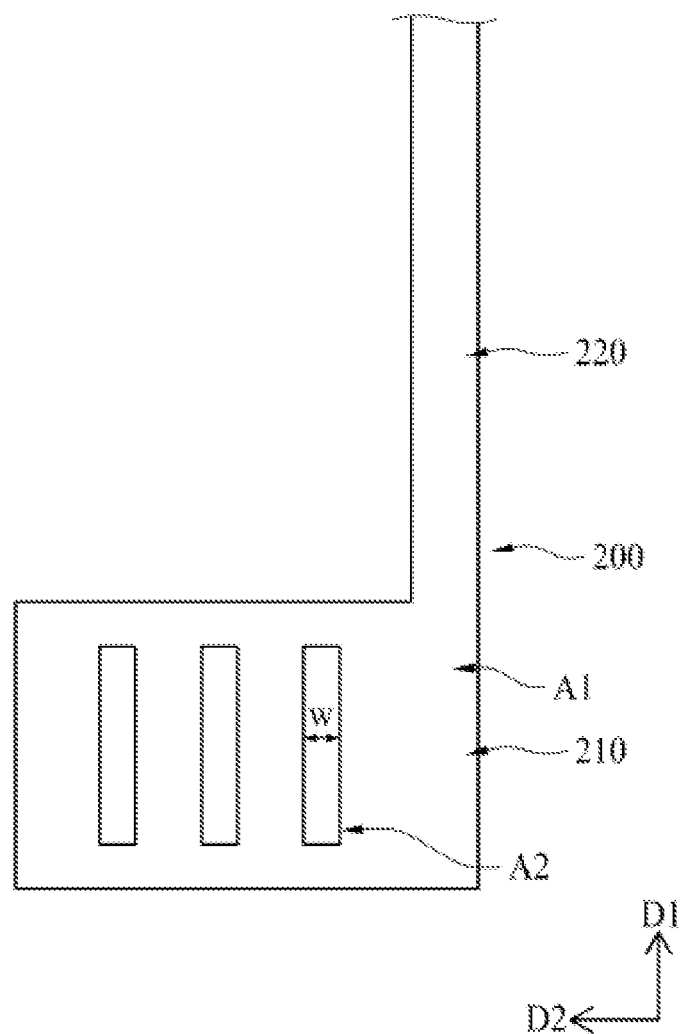
FIGS. 11A, 11B and 11C are plan views of a test pad according to still another embodiment of the present invention.
Figure 11B:
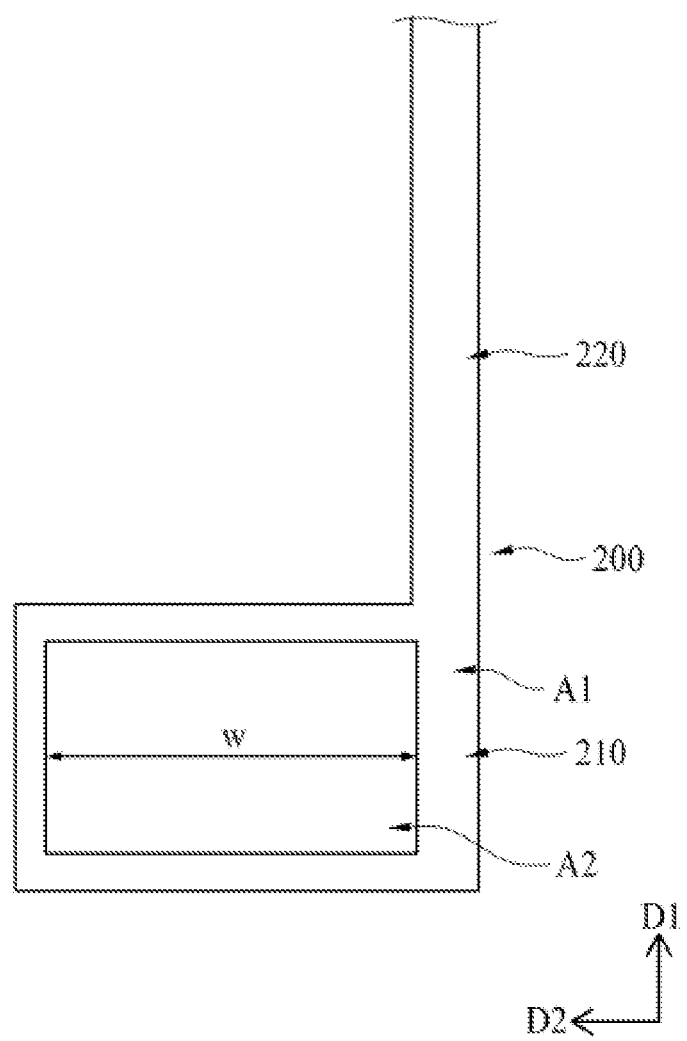
Figure 11C:
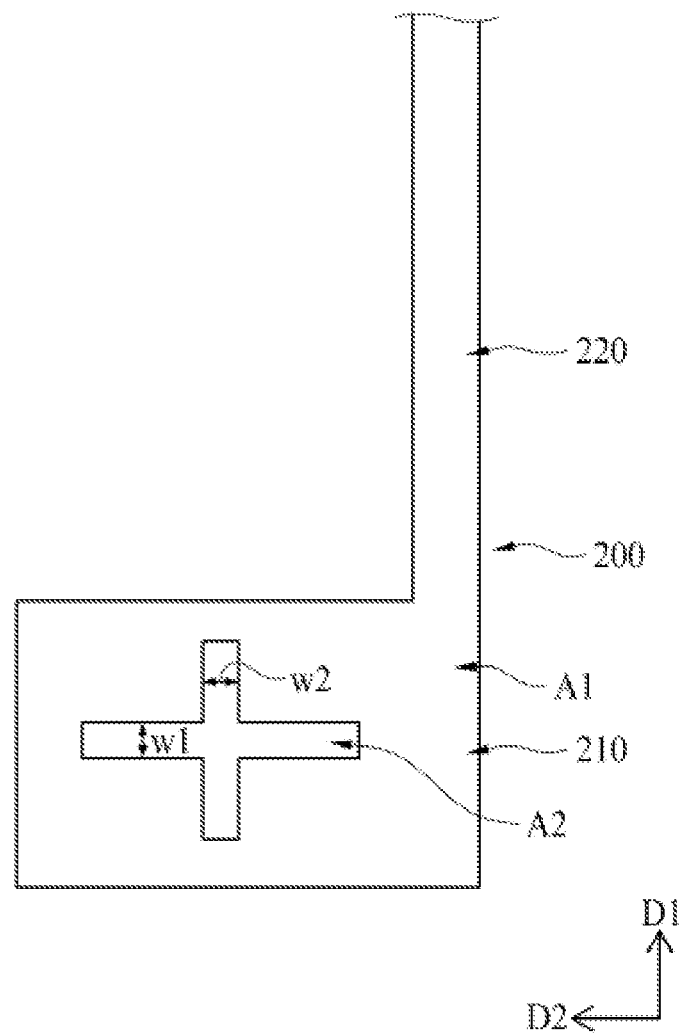

A test pad according to still another embodiment of the present invention will be described in detail with reference to FIGS. 11A to 11C. FIGS. 11A to 11C are plan views of a test pad according to still another embodiment of the present invention.

The test pad 200 shown in FIGS. 11A to 11C may have the same structure as the above-described test pad according to the embodiment of the present invention or the test pad 200 according to another embodiment of the present invention.

According to still another embodiment of the present invention, the test pad 200 includes the base film 110 divided into the first region A1 and the second region A2 having a shape surrounded by the first region A1 in a plan view. Specifically, in still another embodiment of the present invention shown in FIGS. 11A to 11C, like the test structure according to the embodiment of the present invention described above, the test pad 200 may include the first conductive layer 211 and the second conductive layer 212 located in the first region A1 and not located in the second region A2. Alternatively, like the test pad according to another embodiment of the present invention described above, the test pad 200 may include the first conductive layer 211 and the second conductive layer 212 located in the first region A1 and the second region A2, and the insulating member 130 located in the first region A1 and not located in the second region A2.

According to still another embodiment of the present invention, as shown in FIG. 11A, the base film 110 of the test pad 200 is divided into a first region A1 and a plurality of second regions A2 having a shape surrounded by the first region A1 in a plan view. In this case, the second region A2 may have a rectangular shape that extends in the first direction D1. In particular, according to the present invention, the second region A2 may have a width greater than a width of the probing needle so that the probing needle is inserted and fixed in the second region A2 and comes into contact with at least one of the first conductive layer 211 and the second conductive layer 212. For example, the second region A2 may have a width w of 20 μm or more in the second direction D2.

According to still another embodiment of the present invention, as shown in FIG. 11B, the base film 110 of the test pad 200 is divided into the first region A1 and the second region A2 having a shape surrounded by the first region A1 in a plan view. At this time, the second region A2 may have a square shape that extends in the first direction D1 and the second direction D2. In particular, according to the present invention, the second region A2 may have a width greater than the width of the probing needle so that the probing needle is inserted and fixed in the second region A2 and comes into contact with at least one of the first conductive layer 211 and the second conductive layer 212. For example, the second region A2 may have a width w of 20 μm or more in the first direction D1 or the second direction D2 and may have an area greater than or equal to a predetermined area of the conductive layer area.

According to still another embodiment of the present invention, as shown in FIG. 11C, the base film 110 of the test pad 200 is divided into the first region A1 and the second region A2 having a shape surrounded by the first region A1 in a plan view. At this time, the second region A2 may have a cross shape that extends in the first direction D1 and the second direction D2. In particular, according to the present invention, the second region A2 may have a width greater than the width of the probing needle so that the probing needle is inserted and fixed in the second region A2 and comes into contact with at least one of the first conductive layer 211 and the second conductive layer 212. For example, the second region A2 may have a width w of 20 μm or more in each of the first direction D1 and the second direction D2.

However, the shape of the second region A2 according to the present invention is not limited thereto, and the conductive layer 210 or the insulating member 130 that defines the second region A2 may be formed according to various shapes.

It will be apparent to those skilled in the art that various modifications and variations can be made in the present disclosure without departing from the spirit or scope of the disclosures.

Therefore, it should be understood that the above-described embodiments are not restrictive but illustrative in all aspects. The scope of the present disclosure is defined by the appended claims rather than the detailed description, and it should be construed that all alternations or modifications derived from the meaning and scope of the appended claims and the equivalents thereof fall within the scope of the present disclosure.

What is claimed is:

1. A test pad for testing a chip on film (COF) package on which a driving integrated circuit (IC) is mounted, the test pad comprising:
   a base film divided into a first region and a second region; and
   a conductive layer located in the first region, wherein
   the second region is surrounded by the first region in a plan view, and
   the second region does not overlap the driving IC.

2. The test pad according to claim 1, wherein
   the conductive layer includes a first conductive layer located in the first region, and
   a second conductive layer which is located on the first conductive layer and is in contact with the first conductive layer.

3. The test pad according to claim 1, wherein the base film is exposed in the second region.

4. The test pad according to claim 1, wherein
   a groove formed in the second region has a side surface defined by the conductive layer located in the first region and a bottom surface defined by the base film.

5. The test pad according to claim 1, further comprising:
   an insulating member located on the conductive layer in the first region, wherein
   the conductive layer is located in the first region and the second region.

6. The test pad according to claim 5, wherein
   a groove formed in the second region has a side surface defined by the insulating member and a bottom surface is defined by the conductive layer located in the second region.

7. The test pad according to claim 1, wherein the second region has a width of 20 μm or more.

8. The test pad according to claim 1, wherein
   the test pad comprises a groove in the second region for accommodating a probe object for testing the COF package.

9. A chip on film (COF) package in which a driving integrated circuit (IC) is mounted, the COF package comprising:
   a wiring structure connected to the driving IC; and
   a test pad connected to the wiring structure, wherein
   the test pad includes a base film divided into a first region and a second region, and a conductive layer located in the first region,
   the second region is surrounded by the first region in a plan view, and
   the second region does not overlap the driving IC.

10. The COF package according to claim 9, wherein the conductive layer includes a first conductive layer located in the first region and a second conductive layer in contact with the first conductive layer.

11. The COF package according to claim 10, wherein
    at least one of the first conductive layer and the second conductive layer located in the first region surrounds the second region in a plan view, and
    the base film is exposed in the second region.

12. The COF package according to claim 10, wherein
    a groove formed in the second region has a side surface defined by at least one of the first conductive layer and the second conductive layer located in the first region and a bottom surface defined by the base film.

13. The COF package according to claim 9, wherein the test pad further includes an insulating member located on the conductive layer in the first region.

14. The COF package according to claim 13, wherein
    a groove formed in the second region has a side surface defined by the insulating member located in the first region and a bottom surface defined by at least one of a first conductive layer and a second conductive layer located in the second region.

15. The COF package according to claim 13, wherein
    the insulating member extends in a first direction in which the wiring structure extends and covers at least a part of the wiring structure, and
    the insulating member includes a solder resist.

16. The COF package according to claim 9, wherein
the conductive layer includes a first conductive layer
  located in the first region and a second conductive layer
  in contact with the first conductive layer,
the wiring structure includes a first wiring pattern layer
  located on the base film and a second wiring pattern
  layer located on the first wiring pattern layer, and
the first wiring pattern layer and the first conductive layer
  are integrally formed, and the second wiring pattern
  layer and the second conductive layer are integrally
  formed.

17. The COF package according to claim 9, wherein
the COF package comprises a groove in the second region
  for accommodating a probe object for testing the COF
  package.

* * * * *